United States Patent [19]
Porter et al.

[11] 3,780,365
[45] Dec. 18, 1973

[54] DIGITAL METHOD AND SYSTEM FOR MATERIAL HANDLING

[75] Inventors: Lawrence C. Porter, Palos Verdes Peninsula; Kenneth E. Graves, Saratoga, both of Calif.

[73] Assignee: The Upjohn Company, Kalamazoo, Mich.

[22] Filed: Nov. 18, 1970

[21] Appl. No.: 90,752

Related U.S. Application Data

[63] Continuation-in-part of Ser. No. 733,712, May 31, 1968, Pat. No. 3,590,227 and Ser. No. 733,533, May 31, 1968, Pat. No. 3,600,533.

[52] U.S. Cl................. 318/318, 235/92, 318/329, 318/636
[51] Int. Cl. ........................... G06g 7/57, H02p 5/00
[58] Field of Search................ 318/603, 605, 77–85, 318/314, 318, 329, 341, 11, 636; 328/129–134; 235/92

[56] References Cited
UNITED STATES PATENTS 3,048,751 8/1962 Taylor............................ 318/341 X
3,462,665 8/1969 Espey et al...................... 318/85
3,551,752 12/1970 Haner et al..................... 318/603 X
3,064,173 11/1962 Breen et al. .................... 318/77 X
3,549,948 12/1970 Jaeschke......................... 318/85 X Primary Examiner—J. D. Miller
Assistant Examiner—Robert J. Hickey
Attorney—Fidler & Bard

[57] ABSTRACT

Methods and apparatus are disclosed for controlling fluid flow in a flow system as a function of the rpm of a pump shaft and as a function of the mass transfer rate of another material. In one form of the invention, a pulse train is established having a frequency indicative of the rpm of the shaft of the pump. This frequency is compared with a preselected frequency, and any difference is translated into a functionally related number of error or correction pulses. The pump motor is provided with a stepper-type adjustment circuit which corrects the rpm of the motor and pump drive shaft in response to, and as a function of, the number of error pulses.

18 Claims, 2 Drawing Figures

Lawrence C. Porter &
Kenneth E. Graves
INVENTORS

BY   FIDLER & BARD

ATTORNEYS

DIGITAL METHOD AND SYSTEM FOR MATERIAL HANDLING

PRIORITY OF INVENTION

This patent application is a continuation-in-part of the copending Pat. application Ser. No. 733,712, now Pat. No. 3,590,227 which was filed May 31, 1968, and the copending Pat. application Ser. No. 733,533, now Pat. No. 3,600,533 which was also filed May 31, 1968.

BACKGROUND OF INVENTION

This invention relates to improved methods and apparatus for regulating both batch and one-shot chemical processes and the like and, more particularly, relates to simplified digital methods and apparatus for regulating the blending rates of two or more commingling liquid streams.

It is well known to blend different liquid reactants together in preselected proportions to produce a product, and it is also well known that it is extremely difficult to maintain the blend proportions of a plurality of different input streams within close tolerances. As shown in the copending patent applications hereinbefore mentioned, there are digital process controllers now available which are capable of regulating the blend proportions of many different input streams within extremely precise limits. Such controllers are complex and quite expensive, however, and thus are suitable only for large volume processes which cannot effectively be regulated without the use of control equipment of such magnitude.

There are many occasions wherein precise blend proportions must be established and maintained, but wherein it is either inconvenient or impractical to employ the type of expensive and elaborate control equipment which is characteristic of the prior art apparatus and methods. For example, it is often desired to produce a high quality material which can be produced only by the use of precision blending apparatus, but in a limited amount, which does not economically justify the purchase of expensive control equipment of the prior art. In another example, there are many instances wherein precision blending operations may be conducted on frequent occasions but wherein it is sought to produce various different materials at various times. If the materials differ in the number of different reactants which are combined, and if the control apparatus of the prior art is employed, this will necessitate the purchase of apparatus capable of handling the maximum number of different reactants, notwithstanding the fact that most of the blends will not require the use of such elaborate equipment.

It will therefore be apparent from the foregoing that there has long been a need for simpler control techniques and apparatus which are more economical to purchase and maintain but which are also capable of regulating the blend proportions with a precision equal or substantially equal to that which is provided by the apparatus and techniques of the prior art. More particularly, there has long been a need for digital controller techniques and apparatus which are simpler and more economical, since it is only with digital control methods and apparatus that such precision can effectively be achieved.

The use of digital-type equipment has heretofore appeared to be inconsistent with the concept of simplicity, however, and thus no such methods or apparatus have been previously available from the prior art. These and other disadvantages of the prior art are overcome with the present invention, however, and novel methods and apparatus are disclosed herein for providing digital control of blending and like operations in a simplified and more economical manner.

SUMMARY OF INVENTION

The broad objective of the present invention is to provide novel methods and apparatus for digitally controlling the magnitude of at least one parameter of an operating system as a function of either another parameter of the system or as a function of some abstract value having a related characteristic. In a preferred embodiment of the invention wherein it is sought to regulate the throughput rate of a pump, novel means and methods are provided for controlling the throughput rate of the pump as a function of either the output frequency of either a clock frequency or the like, or as a function of the throughput rate of another different pump in the system. Since these novel methods and apparatus are intended to employ digital principles, it is preferred that means be employed to provide a train of electrical pulses or other digital representation of either the throughput rate of the pump (or the shaft velocity of the motor which drives it). Digital comparing means may then be employed to derive a decimal representation of the ratio of the pump throughput rate to either the clock signal or the throughput rate of the other pump, and to compare this decimal representation with a representation of the ratio sought to be maintained to provide an error indication (if any) which is expressed in one or more pulses or counts. The error pulses thus derived constitute a digital signal which can be utilized directly for the purpose of adjusting either the motor speed or the pumping rate of the pump, provided the time base of the throughput or shaft speed signal is equal to the time base of either the clock frequency or the signal representing the throughput rate of the other pump.

It will be apparent that since apparatus of the type hereinbefore described can operate relatively independently of whatever apparatus or method may be employed to regulate any other system parameter, and the clock signal can have any time base provided it is constant. Accordingly, it is most convenient to provide a digital measurement signal which is directly representative of the rpm of the motor shaft, and to count the number of pulses or other functional increments of such signal which occur during the period which is determined by the occurrence of a preselected number of clock pulses or signal increments, to establish the ratio sought to be derived. Further, the number of clock pulses should be some multiple of ten so as to permit the number of measurement pulses which occur during this interval to constitute a decimal expression of the ratio.

For example, the period may be determined by the occurrence of one thousand clock pulses, and if 975 measurement pulses occur during this period, the decimal value of the ratio sought to be established will be 0.975. Furthermore, counting out one thousand clock pulses to establish the sample period will permit the error to be determined to three significant places. For example, if the ratio sought to be maintained is 0.979, a comparison will determine an error of minus four "ratio pulses" which is accurate to three digits provided the time base of the measurement signal is the same as that of the clock signal.

Since the clock signal may be established as desired, the clock signal may always be selected to have a time base which is the same as that of the measurement signal. Also, the number of clock pulses which are utilized to determine the sample period may be any number, provided the number chosen is a multiple of ten, whereby the number of measurement pulses counted will constitute a decimal representation of the ratio sought to be derived. Accordingly, the sample period may be any period sufficient to provide whatever accuracy may be required, provided the period is great enough to permit a representative number of measurement pulses to be collected.

In many blending operations, however, the reactants may be combined disproportionately. For example, it may be desired to feed in a particular component of the mixture at a 1:100 rate or smaller. Whenever the blending proportion of one material is sought to be regulated as a disproportionate function of the blend rate of another material, the sample period will be inadequate unless the time bases of the two signals are also different. In other words, only one measurement pulse will occur during the interval established by the arrival of 100 pulses in the signal representing the throughput rate of the other pump if the blend proportion is 1:100, as hereinbefore suggested. Thus, it may be preferable to generate the measurement signal, for the pump sought to be monitored, at a different time base from that of the signal representing the "base" parameter (the throughput rate of the other pump). In other words, the measurement signal to be controlled may be caused to have a frequency whereby each pulse will represent one-tenth the amount of transferred material which is represented by each pulse in the "base" signal, and this will cause the monitored signal to have a time base which is only one-tenth that of the base signal. In such an event, the number of error pulses derived from a ratio comparison as hereinbefore described will not constitute a true representation of the actual error (if any). Accordingly, novel means and methods are also provided whereby the number of error pulses derived from the comparison is always multiplied by an appropriate factor to derive a digital representation of the true error (if any), whereby this digital representation may also be directly utilized as a correction signal.

It will be apparent, however, that the alternate form of apparatus is nevertheless capable of monitoring and regulating the throughput of a pump without regard for the other parameters of the system which includes or utilizes the pump. Accordingly, it will be further apparent that, in those instances wherein the subject operating system includes two or more pumps or the like which are sought to be monitored and cntrolled, each pump may be individually controlled by apparatus of the type hereinbefore described. Thus, controllers of this type may be added or deleted in the manner of "building blocks," depending upon the number of parameters in the system, whereby a controller assembly may readily and conveniently be provided which is "tailor-made" to the particular system and which may be quickly altered for use with other systems having a different number of operating parameters.

These and other subjects and features of the present invention will be apparent from the following detailed description, wherein reference is made to the figures of the accompanying drawings.

IN THE DRAWINGS

FIG. 1 is a simplified functional diagram of an exemplary embodiment of the present invention, depicting a motor-driven pump having a digital or stepper-type means for establishing the rpm of the pump or motor shaft, and also including a measurement and control section for continually monitoring and regulating the rpm of the pump or motor shaft as a function of either a preselected digital signal or the rpm of another different pump or motor shaft.

FIG. 2 is a simplified functional diagram of a modified form of the apparatus depicted in FIG. 1, wherein the time base of the measurement signal is different from a base digital signal, and wherein means is included to provide a corrected digital signal which represents true error and which may be utilized to directly adjust the rpm of the pump or motor shaft velocity being monitored.

DETAILED DESCRIPTION

Figure 1:
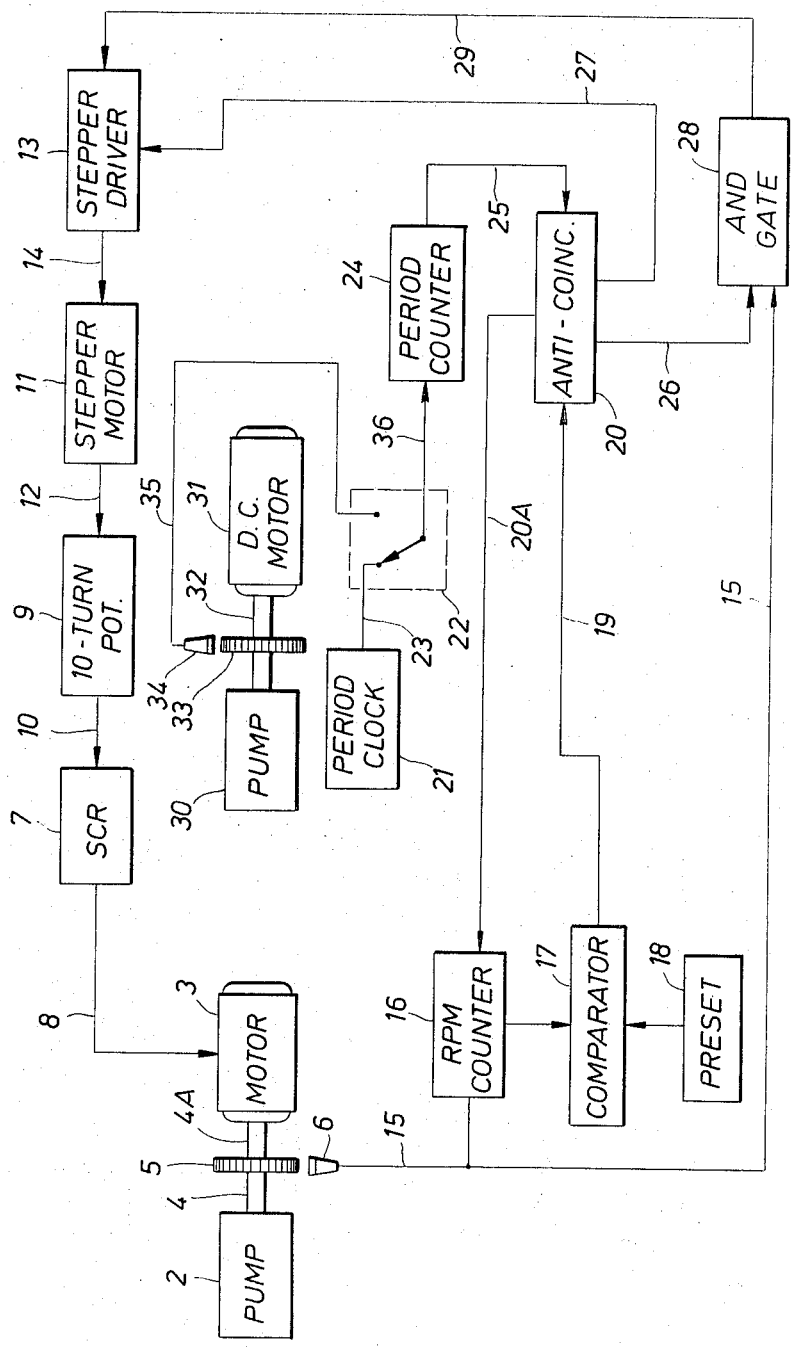

Referring now to FIG. 1, there may be seen a functional diagram illustrating a pump 2 arranged for fluid transfer in a liquid blending system (not depicted), such as a one-shot polymer foam system of the type depicted in the copending U.S. Pat. application Ser. No. 701,596, filed Jan. 30, 1968. As illustrated, the pump drive shaft 4 may be connected directly to the drive shaft 4A of a suitable electric motor 3, or it may be connected to the motor 3 by way of a suitable gear assembly (not depicted). As further illustrated, a spur gear 5, having the tips of the teeth coated with a magnetic material, may be concentrically mounted on either the pump shaft 4 or the motor shaft 4A, and a magnetic pick-up 6 or other suitable sensor is preferably mounted adjacent the rim of the gear 5 to generate an electrical pulse each time one of the gear teeth is rotated past the pick-up 6.

The motor 3, which is preferably DC-operated, is driven at a rate determined by the magnitude of a control voltage 8 provided by a suitable voltage source such as an SCR controller 7. The SCR controller 7, in turn, is adjusted by the voltage output 10 from a ten-turn potentiometer 9, or the like, which is positioned by the output shaft 12 of a bi-directional stepper motor 11. As illustrated, a suitable stepper driver circuit 13, which is preferably responsive to input pulses, is connected to provide stepper output pulses 14 to the stepper motor 11, and the stepper motor 11, in turn, reacts to turn the wiper arm of the potentiometer 9 to the extent determined by the number of input pulses to the stepper driver circuit 13.

Referring again to FIG. 1, the magnetic pick-up 6 may be seen to generate a pulse train 15 with a frequency representative of the rpm of either the motor shaft 4A or the pump shaft 4, depending on the location of the spur gear 5. Since the motor 3 usually operates at a higher speed than the pump 2, it is generally preferable to mount the spur gear 5 on the motor shaft 4A, whereby the pulse train 15 will have a frequency substantially directly proportional to the rpm of the motor 3.

A suitable pulse counter 16 may be provided with its input terminal connected to receive and count the functional increments of the signal 15 being provided by the pick-up 6 and having its output portion connected to a comparator circuit 17. An adjustable preset adjustment 18 of conventional design may also be included, whereby the comparator 17 may be caused to generate an output pulse signal 19 or other suitable indication whenever the counter 16 has accumulated a predetermined number of input pulses as determined by the preset 18, and this output pulse signal 19 is applied to one of the input terminals of a suitable anti-coincidence circuit 20.

As may be further seen, there is preferably included a suitable clock circuit 21 for generating a clock signal 23 composed of pulses at a preselected frequency. The clock signal 23 is connected to one input terminal of a suitable single-pole double-throw switch 22 having its output lead 36 connected to the input terminal of a BCD counter 24 or the like. This counter 24 is preferably arranged to generate a period pulse signal 25 whenever the period clock 21 has produced a preselected number of clock pulses 23. Since the frequency of the clock signal 23 is preselected, the arrival of the period pulse 25 at the other input terminal of the anti-coincidence circuit 20 will occur whenever a preselected number (such as one hundred) pulses 23 have been received by the period counter 24.

If the period pulse 25 and the output pulse 19 from the comparator 17 both arrive at the anti-coincidence circuit 20 at the same instant (or substantially so), this will indicate that the actual rpm of the motor 3 is the same (or substantially the same) as the rpm sought to be maintained by the preset circuit 18. On the other hand, if the two pulses or signals arrive at different times, this will indicate a deviation of the actual rpm of the motor 3 from the preselected rpm established by the preset 18, and the time differential between the two arrivals will be proportional to the magnitude of this deviation.

More particularly, if the period pulse 25 arrives at the anti-coincidence circuit 20 before the output signal 19 from the comparator 17, this indicates that the actual rpm is less than that sought to be established and maintained. On the other hand, if the period pulse 25 arrives later than the output signal 19, the actual rpm of the motor shaft 4A exceeds the rpm sought to be maintained.

Referring again to FIG. 1, it may be seen that the anti-coincidence circuit 20 is arranged to generate a gating signal 26 of a duration equal to the time interval (if any) between the occurrence of the period pulse 25 and the comparator output pulse 19. This gating signal or pulse 26, in turn, actuates or opens a conventional AND gate 28 or other suitable circuit to cause it to produce or pass a correction siganl 29 composed of the number of pulses which occur in signal 15 during the continuance of this gating signal or pulse 26. Thus, the number of pulses in the correction signal 29 will be a direct representation of the difference between the actual rpm of the shaft 4 and the preselected shaft rpm as established by the preset 18. As may also be seen, the stepper driver 13 is directly responsive to the pulses in the correction signal 13, and its output signal 14 will consequently be directly representative of the number of pulses composing the correction signal 29.

Since the actual rpm may be either greater or less than the preselected rpm, it is necessary to drive the stepper motor 11 in the proper direction. Thus, the anti-coincidence circuit 20 is also arranged to generate a suitable polarity control signal 27 to determine the direction of rotation of the stepper motor 11 by the stepper driver 13. In a suitable form of the invention, the polarity control signal 27 may be generated only when the period pulse 25 arrives before the occurrence of the comparator output signal 19, whereupon the output signal 14 from the stepper driver 13 will have one polarity and will drive the stepper motor 11 in reverse. On the other hand, if the period pulse 25 arrives either with or after the comparator output signal 19, there will be no polarity control signal 27, and the output signal 14 from the stepper driver 13 will be normally of an opposite polarity.

It will be apparent that the apparatus is preferably arranged to revert to its original state after each simple and/or correction cycle. Accordingly, the anti-coincidence circuit 20 is preferably adapted to generate a reset signal 20A to restore the rpm counter 16 to reference or "zero" count when the correction pulses 29 have been delivered to the stepper driver 13. Since the function of the period counter 24 is merely to count a predetermined number of pulses from the switch 22, it may be adapted to reset itself automatically upon generating the period pulse 25. However, the reset signal 20A may also be connected to reset both counters 16 and 24 at the same instant. In either case, it will be apparent that the apparatus will continually cycle itself through sample period after sample period to provide continuous monitoring and correction of the rpm of the motor shaft 4A, since each resetting of the period counter 24 will initiate another sample period.

Figure 2:
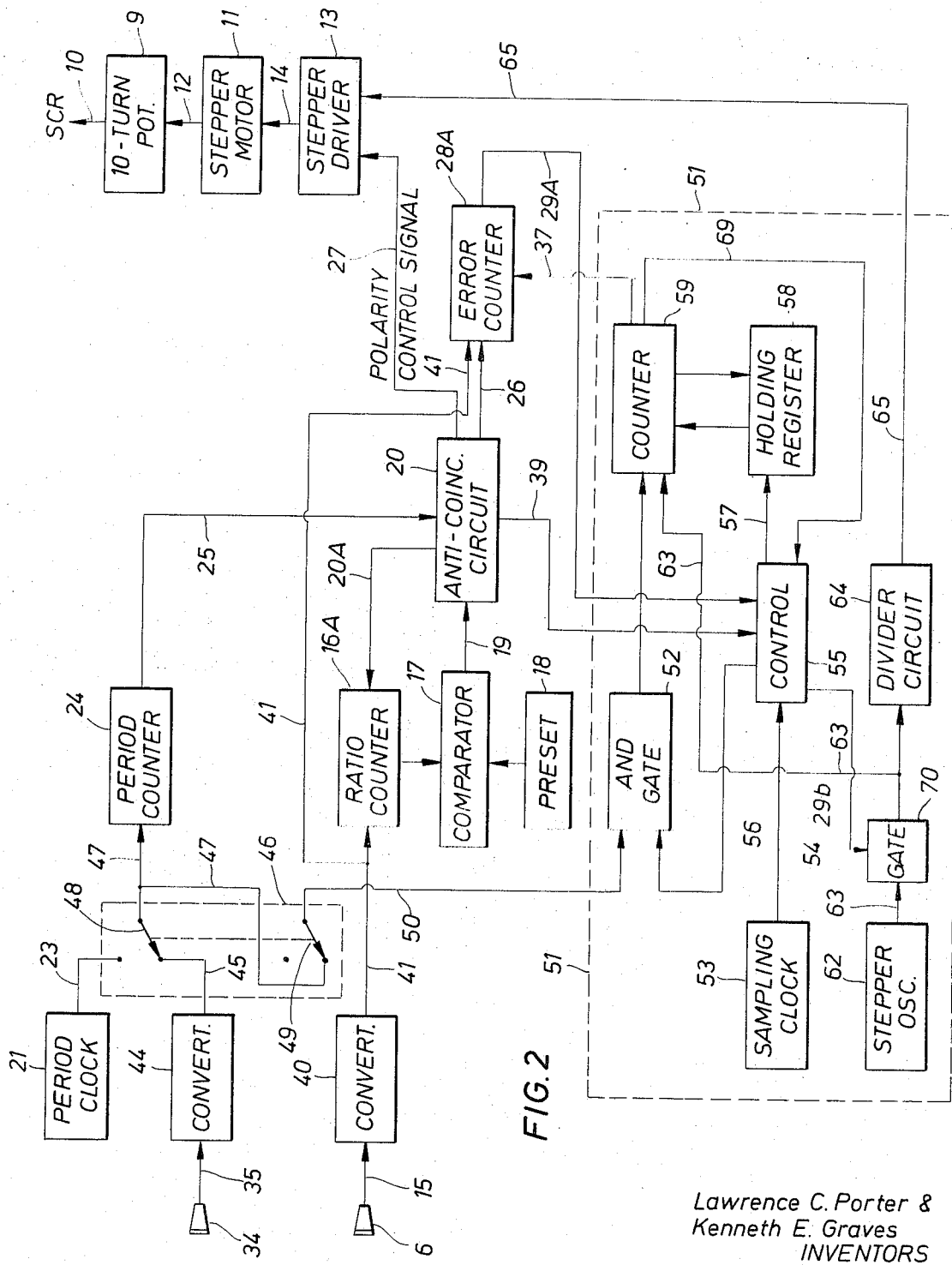

Referring now to FIG. 2, there may be seen a modified form of the system depicted in FIG. 1, wherein provision is included to control the ratio of the mass transfer rate of the material actually handled by the pump 2 to the mass transfer rate of the material actually being handled by the other pump 30. In such an arrangement, it is preferable to provide indicating signals composed of pulses which directly represent units of mass transfer. Accordingly, the pulse train 15 which is provided by the magnetic pick-up 6 is preferably introduced to the input side of a suitable frequency-to-frequency converter 40, such as that described in the copending patent application Ser. No. 733,377, filed May 31, 1968 by L. C. Porter and K. E. Graves; the output signal 41 from the converter 40 will be composed of pulses occurring at a frequency which is substantially representative of the throughput rate of the pump 2 rather than the rotation velocity or rpm of the shafts 4 and 4A. Similarly, the pulse train 35 from the pick-up 34 is preferably connected to another frequency-to-frequency converter 44 of the same design to provide an output frequency 45 which is more directly indicative of the mass transfer rate of the material being handled by the pump 30, rather than the rpm of the shaft 32.

A suitable double-pole, double-throw switch 46 is preferably arranged with one switch arm 48 connected to select either the output frequency 45 from the converter 44 or the clock signal 23 from the period clock 21. The other switch arms 49 is ganged with switch arm 48 to feed the frequency 45 through conductor 50 into one input of an AND gate 52, but only when the first switch arm 48 selects the converter 44. As will hereafter be made clear, the motor 3 may thus be selectively controlled either as a function of the ratio of the actual mass transfer rate of the pump 2 (or the rpm of the motor 3 if the converter 40 is eliminated or by-passed)

to the period frequency 23, or as a function of the ratio of the mass transfer rate of the pump 2 to the mass transfer rate of the pump 30.

Referring again to FIG. 2, the output frequency 41 from the first converter 40 is connected to the input of a suitable pulse counter 16A, which may be the "rpm counter" 16 depicted in FIG. 1, but which is referred to in FIG. 2 as the "ratio counter" 16A. If the preset 18 is preadjusted to establish the ratio sought to be maintained, the comparator 17 will generate an output signal 19 to the anti-coincidence circuit 20 in the manner hereinbefore described with respect to FIG. 1. Similarly, the anti-coincidence circuit 20 will also generate an error signal 26 having a duration representative of the time interval (if any) between the arrival of the period pulse 25 from the period counter 24, and the output signal 19 from the comparator 17, plus a polarity control signal 27 to indicate or establish the priority of these two actuating signals.

As hereinbefore stated, it is often necessary to control the ratio of two mass transfer rates of greatly dissimilar proportion, and wherein the pulses in the output frequency 41 represent units of mass transfer different from those represented by the pulses composing the output frequency 45 from the other converter 44. In such a case the time base of the output frequency 41 which is one second and the sample period duration established by output frequency 45 will be different, and thus the number of measurement pulses 41 which are collected by the bi-directional error counter 28A during the existence of the gating signal 26 will be functionally indicative of a difference in ratio rather than the true difference between the actual mass transfer rate of the pump 2 and the rate sought to be maintained. Accordingly, if the stepper driver 13 is to be actuated as described with respect to FIG. 1, it is necessary to convert the "apparent error" as established or represented by the signal 29A to a digital signal which is the "true error." Broadly stated, this may be accomplished by multiplying the number of pulses in the counter 28A by a factor which is equal to the ratio of the time base of the signal 45 from converter 44 to the length of the sample period to derive the proper number of correction pulses to be used to actuate the stepper driver 13. In the system illustrated in FIG. 2, this multiplication is provided by a multiplier circuit 51 which is connected into the apparatus only when the switch 46 is positioned to select the "master frequency" provided by the converter 44, since the time base of the sample period established by the counter 24, when it is connected to the period clock 21, is preferably the same as that of the output frequency 41 from the first converter 40.

The multiplier 51 depicted in FIG. 2 may include a sampling period clock 53 to deliver a timing pulse 54 having a preselected duration such as a tenth of a second, and this timing pulse 54 is applied to a suitable control circuit 55. The control circuit 55 responds by generating a first gating signal 56 to open the AND gate 52, whereby pulses of the "master frequency" 45 being conducted through leads 47 and 50 will be passed by the AND gate 52 to the pulse counter 59. Upon termination of the timing pulse 54, the control circuit 55 discontinues the gating pulse 56 to the AND gate 52 and applies a command signal 57 to the holding register 34 to cause it to receive the pulse count accumulated by the counter 59 during the existence of timing pulse 54 provided by the sampling clock 53.

It may be noted that a stepper oscillator 62 is preferably included to continuously provide pulses 63 at a constant frequency, and that these oscillator pulses 63 are applied to the input of an appropriate divider circuit 64 and also to the input of an appropriate divider circuit 64 and also to the counter 59. After both pulses 25 and 19 have been delivered to the anti-coincidence circuit 20, the anti-coincidence circuit 20 generates a command signal 39 to the control circuit 55, and a complement of the count then in the holding register 58 is caused to be transferred to the counter 59. Simultaneously, the control circuit 55 enables the divider circuit 64 to commence transmitting oscillator pulses 65 to the stepper driver 13 at a frequency which is a preselected dividend of the frequency of the incoming oscillator pulses 63. Simultaneously, the same oscillator pulses 63 applied to the divider circuit 64 begin running into the counter 59. As hereinbefore stated, the counter 59 contains the complement of the pulse count held in the holding register 58, and thus each oscillator pulse 63 entering the counter 59 functions to increase the pulse total held therein by one until the counter 59 reaches capacity.

When the counter 59 reaches capacity, it generates a pulse 37 to the error counter 28A to reduce by one the total error pulse count contained therein. Simultaneously, the counter 59 is caused to generate a command signal 69 to the control circuit 55, and the control circuit 55 again transfers the complement of the pulse count originally accumulated in the counter 59 from the holding register 58 back into the counter 59. At this point, the oscillator pulses 63 continue to run into the counter 59 until capacity is reached, and the counter 59 will again discharge to reduce by one the total ratio error pulse count then remaining in the error counter 28A. This sequence continually repeats itself until the error counter 28A is driven to zero, whereupon a command signal 29A from the error counter 28A causes the control circuit 55 to provide a disabling pulse 29B to an AND gate 70, to interrupt the input of oscillator pulses 63 to the divider 64 and the counter 59.

It may be seen that if the pulses which are accumulated in the error counter 28A from the frequency 41 were to be applied directly to the stepper driver 13 as depicted in FIG. 1, and if (for example) the sample period is only a fraction of the time base of the output 41 from the converter 40, the stepper motor 11 will be driven only a fraction of the number of digital increments required to correct the actual difference between the transfer rate established by the setting of the preset 18 and the actual mass transfer rate of the pump 2 as represented by the frequency 41. It may be seen, however, that the number of correction pulses 65 transmitted from the divider circuit 64 to the stepper driver 13 will be a multiple of the number of pulses in the error counter 28A, and that this multiple corresponds to the multiplying factor hereinbefore defined.

The multiplier circuit 51 is, of course, arranged to always provide the appropriate number of pulses 65, irrespective of whatever may be the value of the frequency 45. The sample period may, on occasion, even be the same as the time base of the frequency 41 sought to be controlled. In such a case, however, it will be apparent that although the multiplier circuit 51 is connected into the apparatus by the position of switch 46, the pulses 65 which are applied to the stepper driver 13 will be the same in number as the pulses accumulated in the error counter 28A.

Various other modifications may suggest themselves from a consideration of the methods and apparatus described herein and depicted in the drawings. Accordingly, it should be understood that the forms of the present invention described herein and illustrated by the structure and processes depicted in the drawings, are illustrative only and are not intended as limitations on the present invention.

What is claimed is:

1. Apparatus for establishing and maintaining a preselected material flow, comprising:
    pump means having a rotatable input shaft,
    an electric motor having a rotatable output shaft interconnected to drive said pump input shaft,
    indicating means for generating pulses functionally related to the rotation of one of said shafts,
    period means for defining a succession of time increments each beginning with the termination of the immediately succeeding one of said increments,
    a pulse counter for receiving and counting pulses occurring during each of said time increments,
    a preset means for generating a functional representation of a preselected number of said pulses,
    a comparator interconnected with said pulse counter and preset means for generating a signal pulse indicating the receipt of said preselected number of said pulses by said pulse counter,
    anti-coincidence means responsive to said period means and comparator for deriving a measurement signal functionally related to any time difference between the termination of any time increment and the occurrence of a correlative signal pulse from said comparator, and
    an error counter responsive to said measurement signal for generating error pulses in number functionally related to the magnitude of said measurement signal,
    said anti-coincidence means further including means for providing a reset signal to said pulse counter.

2. The apparatus described in claim 1, wherein said anti-coincidence means further provides an indication to said control means of priority as between the termination of a time increment and a correlative signal pulse from said comparator.

3. The apparatus described in claim 2, wherein said control means includes
    an adjustable controller means for generating a control voltage having a magnitude establishing the velocity of said motor, and
    stepper means interconnected with said controller means and responsive to said priority indication and said error pulses for varying said control voltage a preselected increment for each of said error pulses.

4. The apparatus described in claim 3, wherein said pulse counter receives and counts said rpm pulses occurring during said time increments defined by said period means, and
    wherein said measurement signal from anti-coincidence means is functionally related to any difference between the actual rpm of said motor output shaft during said time increments and a preselected rpm.

5. The apparatus described in claim 4, wherein said period means includes
    a clock generator for generating a preselected frequency of timing pulses, and
    a period pulse generator for generating a period pulse upon the occurrence of a preselected number of said timing pulses.

6. The apparatus described in claim 5, wherein said measurement signal and priority indication are generated by said anti-coincidence means in response to correlative ones of said comparator signal pulse and said period pulse.

7. The apparatus described in claim 3, wherein said indicating means includes
    frequency conversion means responsive to said rpm pulses for generating a train of first output pulses functionally related to units of mass transfer by said pump means, and
    wherein said pulse counter receives and counts said first output pulses from said conversion means.

8. The apparatus described in claim 7, wherein said period means includes
    a frequency source generating a train of second output pulses functionally related to units of mass transfer by another different pump means, and
    a period pulse generator for generating a period pulse upon the occurrence of a preselected number of said second output pulses from said frequency source.

9. Apparatus for establishing and maintaining a preselected shaft speed for a motor comprising
    master frequency means for generating a train of period pulses,
    generating means responsive to the rotation of said shaft for generating electrical pulses functionally related to the speed of said shaft rotation,
    a period counter for defining said first time period as a function of the occurrence of a predetermined number of said period pulses,
    comparing means for defining a second time period as a function of the occurrence of a preselected number of said electrical pulses,
    anti-coincidence means interconnected between said period counter and said comparing means for providing an actuating signal during the occurrence of any difference between every successive first and second time periods,
    electrical gate means having inputs from said anti-coincidence means and said generator means for receiving and passing electrical pulses during the occurrence of said actuating signal, and
    adjusting means for controlling the speed of said motor as a function of the number of said electrical pulses passed by said gate means.

10. The apparatus of claim 9 wherein said means for supplying pulses includes a clock oscillator.

11. The apparatus of claim 9 wherein said means for supplying pulses includes a second motor means having a second rotatable shaft, and means responsive to the rotation of said second output shaft for supplying pulses to said period counter.

12. The apparatus described in claim 9, wherein said adjusting means comprises means for multiplying the number of electrical pulses passed by said gate means by a factor functionally related to the time base of the frequency of said electrical pulses generated by said generating means.

13. A system for regulating the shaft velocity of a motor, comprising
- a first pulse source for providing a train of measurement pulses each functionally related to a preselected increment of shaft rotation,
- a second pulse source for providing a train of period pulses,
- a first counting means for receiving and accumulating measurement pulses from said first pulse source,
- preset means for causing said first counting means to generate a first actuating signal upon receiving a predetermined number of said measurement pulses from said first source,
- a second counting means for receiving period pulses from said second pulse source and for generating a second actuating signal upon receiving and accumulating a predetermined number of said period pulses,
- comparing means for generating a gating signal commencing with the occurrence of the earlier of said two actuating signals and terminating with the occurrence of the later of said two actuating signals,
- gate means for passing measurement pulses generated by said first pulse source during the continuance of said gating signal, and
- adjustment means for incrementally altering the shaft velocity of said motor as a function of the number of measurements pulses traversing said gate,
- said first counting means being reset upon the discontinuance of said gating signal.

14. A system for regulating the shaft velocity of a first motor as a function of the shaft velocity of a second motor, comprising
- a first pulse source for providing a train of data pulses each functionally related to a preselected increment of rotation of the shaft of said first motor,
- a second pulse source for providing a train of period pulses each functionally related to a preselected increment of rotation of the shaft of said second motor,
- a ratio counter for receiving and accumulating data pulses from said first pulse source,
- preset means for causing said ratio counter to generate a first actuating signal when said ratio counter accumulates a preselected total number of said data pulses,
- a period counter for receiving and accumulating period pulses from said second pulse source and for generating a second actuating signal when said period counter has accumulated a preselected total number of said period pulses,
- anti-coincidence means responsive to said period and ratio counters for generating a gating signal during the error time interval beginning with the first occurrence of one of said two actuating signals and ending with the occurrence of the other of said two actuating signals,
- error counting means responsive to said gating signal for receiving and accumulating data pulses during said error time interval,
- multipying means responsive to said error counting means and said second pulse source for generating correction pulses functionally related in number to the number of data pulses accumulated by said error counting means during said error time interval, and
- adjustment means for altering the shaft velocity of said first motor by increments functionally corresponding to the number of said correction pulses generated by said multiplying means.

15. The system described in claim 14, wherein said anti-coincidence means also generates a polarity control signal indicating the earlier occurring of said two actuating signals, and
- wherein said adjustment means is also responsive to said polarity control signal.

16. The system described in claim 15, wherein said multiplying means further includes
- sampling means for establishing a factor corresponding to a function of the ratio of the time base of the frequency of said period pulses to the sample interval during which said preselected number of period pulses is accumulated by said period counter, and
- correction means for causing said adjustment means to alter said shaft velocity of said first motor by a number of increments corresponding to the product of said factor and said number of data pulses accumulated by said error counting means during said error time interval.

17. The multiplying means described in claim 16, wherein said sampling means further comprises
- a sampling clock adapted to generate a gating signal of preselected duration,
- a gate circuit openable in response to said gating signal from said sampling clock to pass period pulses from said second pulse source, and
- adjustment counting means for accumulating pulses from said gate circuit during said gating signal.

18. The multiplying means described in claim 27, wherein said correction means further comprises a stepper oscillator for generating a train of oscillator pulses into said adjustment counting means,
- a divider circuit responsive to said stepper oscillator, and
- means interconnected with said divider circuit for applying said oscillator pulses to said divider circuit at a number functionally related to the product of the number of data pulses in said error counting means and the ratio of the time base of the frequency of said period pulses to the sample interval during which said preselected number of period pulses is accumulated by said period counter.

* * * * *